United States Patent [19]
Kojima et al.

[11] Patent Number: 5,415,438
[45] Date of Patent: May 16, 1995

[54] DRAINAGE VERTICAL TUBE JOINT

[75] Inventors: Noriatsu Kojima, 31, Yanagishima-cho 5-chome, Nakagawa-ku, Nagoya-shi, Aichi 454; Toshihiko Kawamura, Nagoya, both of Japan

[73] Assignee: Noriatsu Kojima, Nagoya, Japan

[21] Appl. No.: 193,066

[22] PCT Filed: Jul. 23, 1993

[86] PCT No.: PCT/JP93/01031

§ 371 Date: Mar. 11, 1994

§ 102(e) Date: Mar. 11, 1994

[30] Foreign Application Priority Data

Jul. 24, 1992 [JP] Japan ................. 4-198812

[51] Int. Cl.$^6$ .............................. F16L 41/00
[52] U.S. Cl. ........................ 285/150; 4/211; 285/153
[58] Field of Search ............ 285/150, 153, 154; 4/211

[56] References Cited

U.S. PATENT DOCUMENTS

| | | | |
|---|---|---|---|
| 3,346,887 | 10/1967 | Sommer | 285/153 |
| 3,736,955 | 6/1973 | Schlesser | 285/150 |
| 4,252,348 | 2/1981 | Kojima | 285/158 |
| 4,998,754 | 3/1991 | Matsumoto et al. | 4/211 |

FOREIGN PATENT DOCUMENTS

| | | | |
|---|---|---|---|
| 2515229 | 4/1983 | France | 285/150 |
| 52-49550 | 11/1977 | Japan . | |
| 142993 | 6/1990 | Japan | 285/150 |
| 2261996 | 10/1990 | Japan | 285/150 |
| 3-12846 | 3/1991 | Japan . | |
| 3-76941 | 4/1991 | Japan . | |
| 3-177692 | 8/1991 | Japan . | |
| 5-20640 | 3/1993 | Japan . | |
| 5-61414 | 9/1993 | Japan . | |
| 5231582 | 9/1993 | Japan | 285/150 |

*Primary Examiner*—Eric K. Nicholson
*Attorney, Agent, or Firm*—Nikaido, Marmelstein, Murray & Oram

[57] ABSTRACT

A drainage vertical tube joint comprising an inner tube (20) provided in hanging-down state at lower side of an upper vertical tube connection port (11), a reduction guide (21) provided in downward inclination on an inner circumferential wall of the inner tube (20) and having its projected end edge (21a) inclined downward in the length direction, a swivel guide (23) projected on an inner circumferential wall of a taper tube part (15) and having its projected end edge (23a) inclined downward in the length direction, wherein the projected end edge (21a) of the reduction guide and the projected end edge (23a) of the swivel guide are opposed and formed in parallel relation in projections of the horizontal plane and formed in intersection relation in projections of the vertical plane, and a ventilation core can be formed accurately in a flowing-down waste water flow.

2 Claims, 5 Drawing Sheets

DRAINAGE VERTICAL TUBE JOINT

TECHNICAL FIELD

The present invention relates to a drainage vertical tube joint where swivel flow is formed in a waste water flowing down within a drainage vertical tube.

BACKGROUND ART

In the prior art, in a drainage vertical tube joint in a drainage ventilation piping structure of single tube type, in order to form swivel flow actively in a waste water flowing in, a reduction guide is installed at lower side of an upper vertical tube connection port, and one or plural swivel guides of spiral shape or blade shape are projected on an inner wall of a taper tube part extending from a swelling part to a lower vertical tube connection port.

Waste water flow subjected to speed reduction and course variation by the reduction guide flows down while supplied with swivel property by the swivel guide, and a ventilation core is formed at the center of the waste water flow flowing down and communication of air of a drainage piping system is intended and pressure variation within the drainage vertical tube is suppressed.

In such a drainage vertical tube joint of conventional construction, however, inner structure of the tube joint becomes quite complicated and there is a problem that clogging is produced due to foreign substance or the like. Also there is a problem that much labor is required for manufacturing the drainage vertical tube joint and the manufacturing cost runs up.

DISCLOSURE OF INVENTION

In view of the above-mentioned problems, an object of the present invention is to provide a drainage vertical tube joint where the tube joint is constituted concisely and ventilation core formation can be carried out accurately in a waste water flow flowing down.

In order to achieve the foregoing object, the present invention is in a drainage vertical tube joint comprising an upper vertical tube connection port connecting an upper drainage vertical tube, a swelling part provided at lower side of the upper vertical tube connection port and having inner diameter larger than that of the upper drainage vertical tube, a taper tube part formed in downward tapering state at lower side of the swelling part, a lower vertical tube connection port provided at lower side of the taper tube part and connecting a lower drainage vertical tube, and at least one lateral branch tube provided on the swelling part and opened in the horizontal direction, wherein the drainage vertical tube joint comprises an inner tube provided in hanging-down state at lower side of the upper vertical tube connection port, a reduction guide projected in downward incline state on an inner circumferential wall of the inner tube and having the projected end edge inclined downward in the length direction, and a swivel guide projected on an inner circumferential wall of the taper tube part and having the projected end edge inclined downward in the length direction, and the projected end edge of the reduction guide and the projected end edge of the swivel guide are opposed and formed in nearly parallel relation in projections of the horizontal plane and formed in intersection relation in projections of the vertical plane.

The present invention is constituted as above described, and a waste water flowing in from the upper drainage vertical tube collides with the reduction guide and is inhibited from flowing down just under it and subjected to speed reduction and guided in the inclination direction of the reduction guide and the course is varied. The waste water flow with its course varied collides with the inner circumferential wall of the taper tube part and subjected to the speed reduction and swiveled and flows down into the lower drainage vertical tube.

Also a waste water flowing in from the lateral branch tube connected to the lateral branch tube connection port has a part colliding with the inner tube and scattered and dropped onto the taper tube part. A residual waste water not colliding with the inner tube is dropped onto the swelling part and the taper tube part and scattered, and the residual waste water together with the above-mentioned scattered waste water as a part flows down along the inner circumferential wall of the taper tube part and is caught by the swivel guide, and then it flows down into the lower drainage vertical tube while subjected to speed reduction and supplied with swivel property or is swirled. Consequently, the waste water is scattered and mixed and becomes state of compression and rarefaction, and due to the compression and rarefaction of the waste water flow, the flowing-down speed is reduced effectively and variation of the air pressure is prevented, and also the air core is formed at the center of the waste water flow and ventilation is carried out between the upper drainage vertical tube and the lower drainage vertical tube.

Also the waste water flowing down from the upper drainage vertical tube is prevented from countercurrently flowing into the lateral branch tube by the inner tube and the reduction guide. Further the waste water flowing from the lateral branch tube is prevented from the direct collision with the waste water flowing down from the upper drainage vertical tube by the inner tube.

BEST MODE FOR CARRYING OUT THE INVENTION

Figure 1:
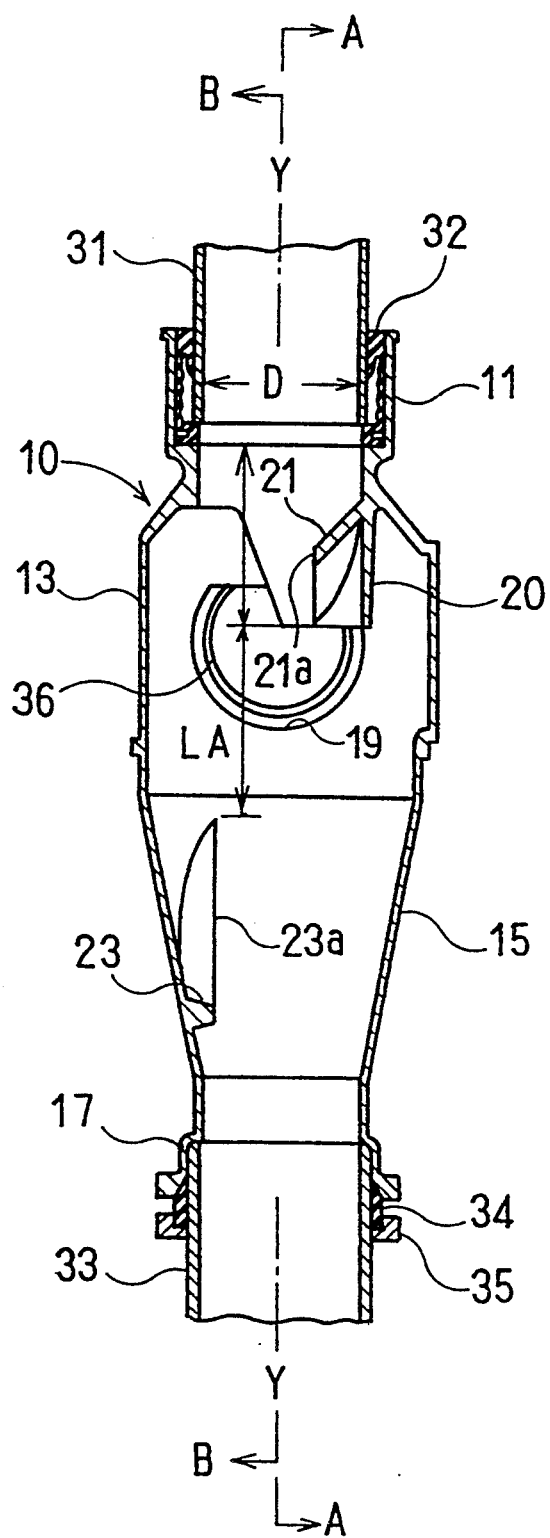
FIG. 1 is a front sectional view of a drainage vertical tube joint as an embodiment according to the invention.

An embodiment of the present invention will be described based on the accompanying drawings as follows.

In FIGS. 1–5, a drainage vertical tube joint designated by reference numeral 10 (hereinafter abbreviated to "tube joint 10") comprises an upper vertical tube connection port 11 provided at upper side of the body for connecting an upper drainage vertical tube 31, a swelling part 13 provided at lower side of the upper drainage vertical tube 11 and having inner diameter larger than that of the upper drainage vertical tube 31, a taper tube part 15 formed in downward tapering state at lower side of the swelling part 13, a lower vertical tube connection port 17 for connecting a lower drainage vertical tube 33, and lateral branch tube connection ports 19, 19 opposed and opened in the horizontal direction on side surfaces of the swelling part 13, and further comprises an inner tube 20 provided at lower side of the upper vertical tube connection port 11, a reduction guide 21 projected on an inner circumferential wall of the inner tube 20, and a swivel guide 23 holding prescribed position relation with respect to the reduction guide 21 and projected on an inner circumferential wall of the taper tube part 15.

The inner tube 20 in the embodiment is formed in half-divided cylindrical shape and hangs down at lower side of the upper vertical connection port 11, and is nearly opposed to the inside opening portion of the lateral branch connection ports 19, 19. Length L of the inner tube 20 is preferably 1.0–1.25 times of the inner diameter D of the upper drainage vertical tube 31 in order to prevent interference with the waste water flowing in from the lateral branch tube 36.

Figure 2:
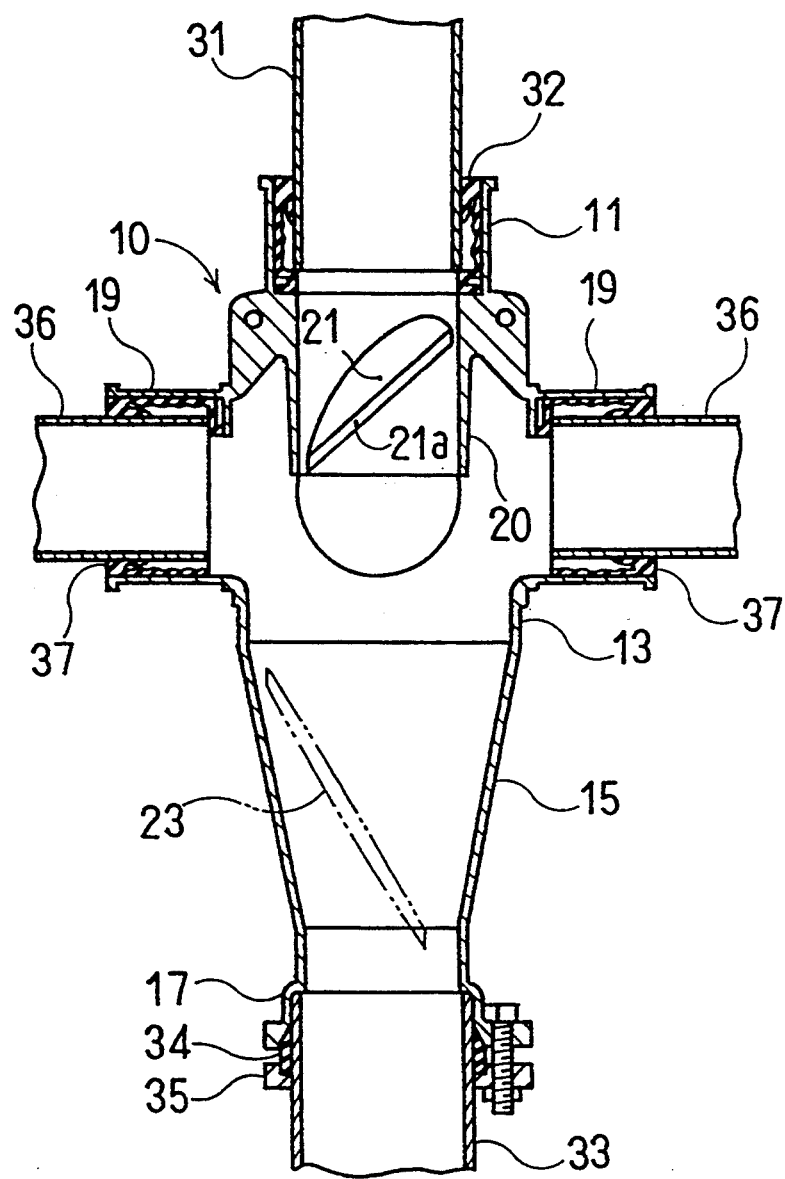
FIG. 2 is a sectional view taken in A—A line of FIG. 1.
Figure 3:
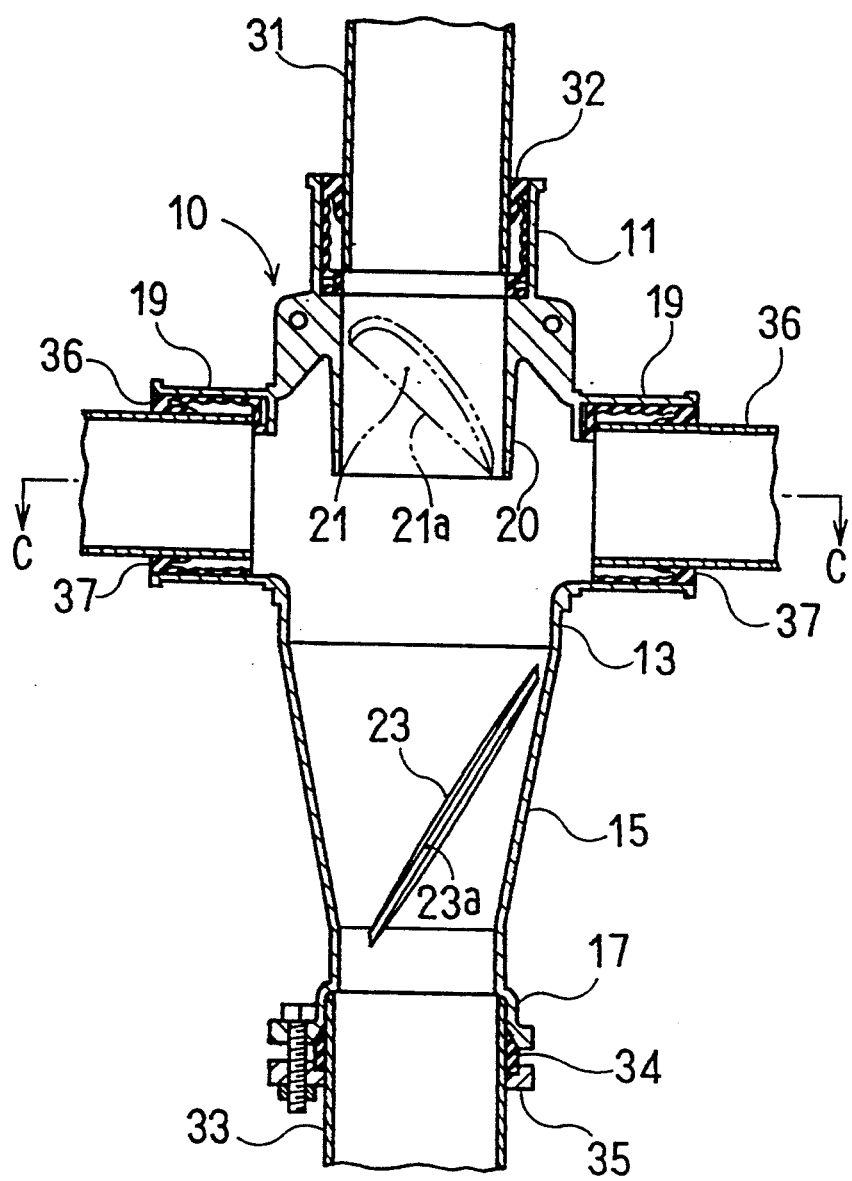
FIG. 3 is a sectional view taken in B—B line of FIG. 1.

The reduction guide 21 is formed in segment shape of circle and is inclined downward and projected from the inner circumferential wall of the inner tube 20, and its projected end edge 21a of linear shape is set in left downward inclination in the length direction (left downward inclination in FIG. 2).

The downward inclination angle of the reduction guide 21 is preferably 40–45 degrees downward with respect to the horizontal line from the point of the reduction effect of the waste water flow from the upper drainage vertical tube 31, and also the left downward inclination angle is preferably 35–45 degrees downward with respect to the horizontal line from the point of changing the direction of the waste water flow and supplying preliminary swivel property. Further the projected end edge 21a is projected on the plane at the inside by about 25% of the inner diameter D from the extension line of the inner circumferential surface of the upper drainage vertical tube 31, and its lower end is set to the same position as that of the lower end of the inner tube 20.

The swivel guide 23 is projected to the taper tube part 15 at the side opposite to the reduction guide 21 with the tube axis Y—Y line therebetween, and rises from upper side of the taper tube part 15 and is formed as a bow-shaped projecting part converging to the inner circumferential wall surface on upper side of the lower vertical tube connection port 17.

The projected end edge 23a of the swivel guide 23 is formed linearly from the upper side to the lower side, and is provided in left downward inclination in the length direction (left downward inclination in FIG. 3), and this left downward inclination angle is preferably 55–65 degrees downward with respect to the horizontal line from the point of supplying the waste water flow with the swivel property. Also the projected end edge 23a is projected on the plane at the inside by about 10% of the inner diameter D from the extension line of the inner circumferential surface of the upper drainage vertical tube 31.

Figure 4:
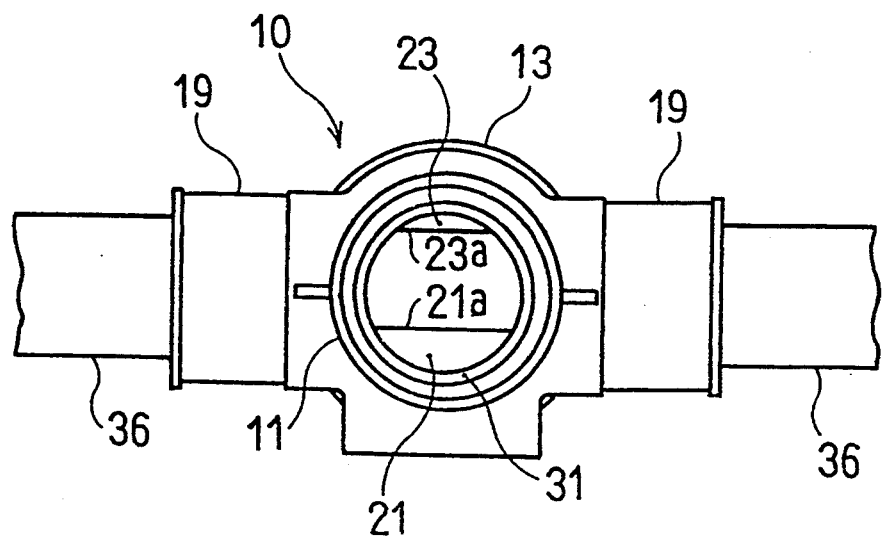
FIG. 4 is a plan view of FIG. 1.
Figure 5:
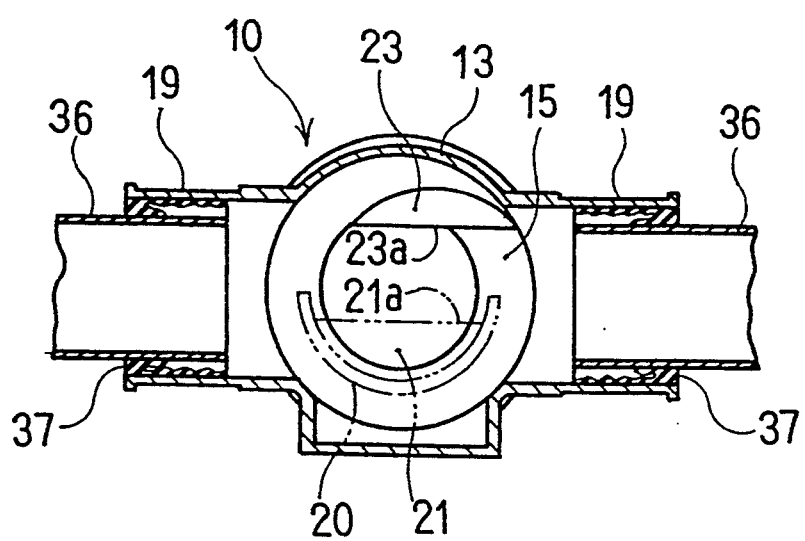
FIG. 5 is a sectional view taken in C—C line of FIG. 3.

Further in the swivel guide 23, its projected end edge 23a is nearly in parallel to the projected end edge 21a of the reduction guide 21 on the drawings of FIGS. 4 and 5 (projections of the horizontal plane). Also the projected end edge 23a and the projected end edge 21a are formed so that the extension lines of those intersect on the drawings of FIGS. 2 and 3 (projections of the vertical plane).

Further the distance LA between the lower end of the reduction guide 21 and the upper end of the swivel guide 23 in the tube axis Y—Y direction is preferably 0.8–1.3 times of the inner diameter D of the upper drainage vertical tube 31 in order to catch accurately the waste water flow being changed in direction and supplied with the preliminary swivel property by the reduction guide 21.

In order to confirm the above-mentioned embodiment, the tube joint 10 has length of the inner diameter being 1.1D, the inward downward inclination angle of the reduction guide 21 being 45 degrees, the left downward inclination angle thereof being 45 degrees, the left downward inclination angle of the swivel guide 23 being 60 degrees, the distance LA being 1.1D and the diameter of the swelling part 13 being 180 mm, and using such tube joint 10, the intratube pressure (mmAq) within the lateral branch tube 36 to the constant flow rate load (L/s) in the drainage tube system of a collective house of nine stories was measured.

Figure 6:
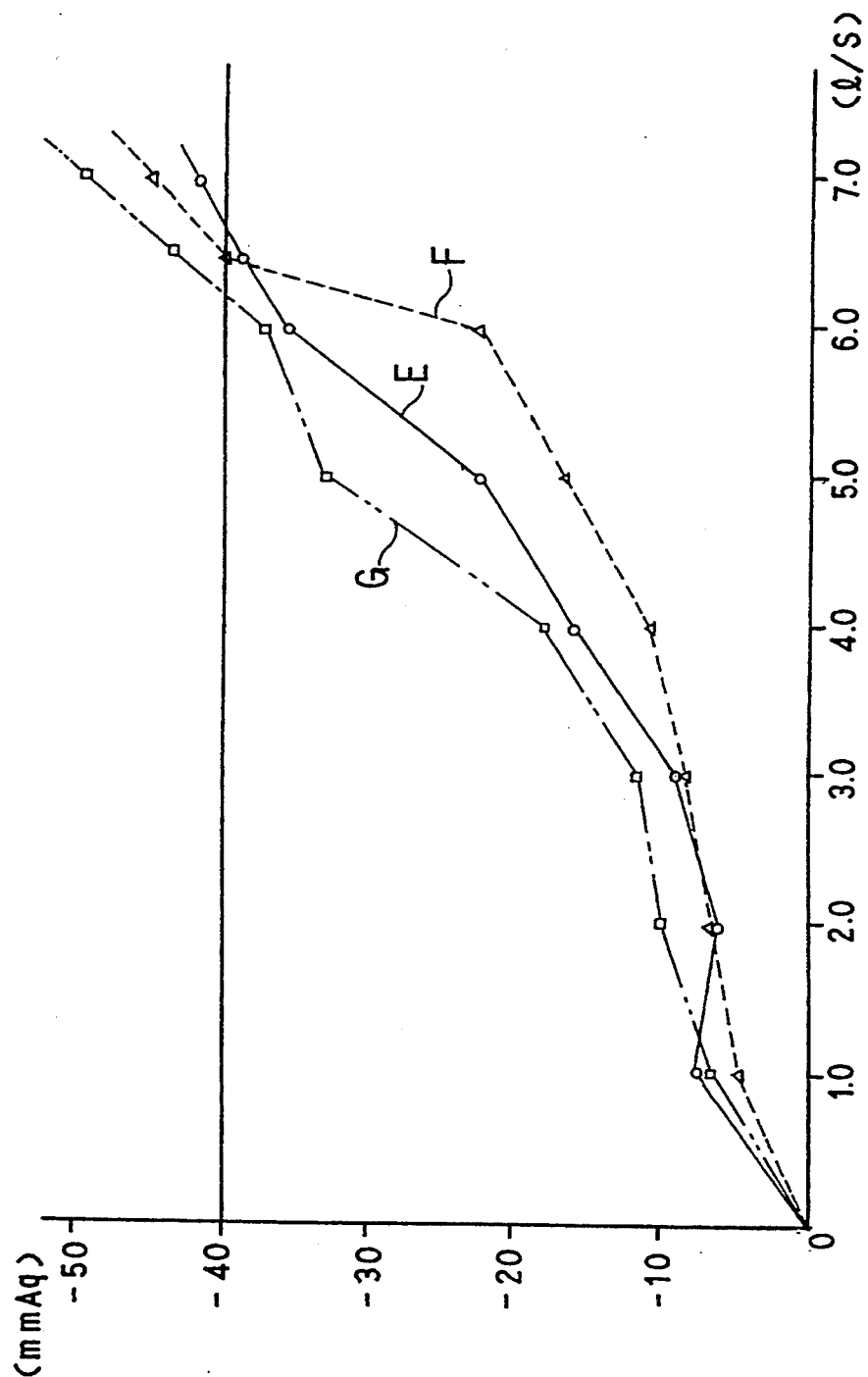
FIG. 6 is a graph measuring variation of pressure within a tube for constant flow rate load state.

As a result, in the tube joint 10 of this embodiment as shown in curve E of FIG. 6, the intratube pressure at the constant flow rate load 6.7 L/s is the standard value (−40 mmAq) or less, and it is recognized that the tube joint 10 has excellent drainage capacity even comparing with a ventilation core type molding drainage vertical tube joint having two blade-shaped swivel guides in the prior art. Also when the distance LA is each of 0.8D, 0.9D, 1.0D, 1.2D, 1.3D, characteristics nearly similar to the curve E are shown.

If the distance LA is less than 0.8D, when the drainage flow rate becomes much, since it is caught by the lower side of the swivel guide 23, pressure variation within the tube becomes large as shown in the curve F of FIG. 6. Also if the distance LA is more than 1.3D, a marked tendency for the waste water flow to flow down immediately is developed, and there is a problem that pressure within the tube rises generally as shown in the curve G.

Next, action of the tube joint 10 in such constitution will be described.

In the tube joint 10, the upper drainage vertical tube 31 from the upper story is connected to the upper vertical tube connection port 11 through a packing 32, and the lower drainage vertical tube 33 to the lower story is tightened and connected to the lower vertical tube connection port 17 through a packing 34 by an annular tightening flange 35. Also the lateral branch tubes 36, 36 of the story are connected to the lateral branch connection ports 19, 19 respectively through a packing 37.

Now, if the waste water from the upper drainage vertical tube 31 enters the tube joint 10, a part of the waste water flow collides with the reduction guide 21 and is subjected to the speed reduction and inhibited from flowing down just under it, and the waste water is guided by the inward downward inclination and the left downward inclination of the reduction guide 21 and the course is varied rapidly. Residual waste water flowing in then is drawn into and attendant upon the waste water with its course varied, and the waste water as a whole varies its course counterclockwise with respect to the tube axis Y—Y. The waste water is scattered and subjected to compression and rarefaction, and drops to the lower side of the swelling part 13 and the upper side of the taper tube part 15 and flows down along the inner circumferential wall of the swelling part 13 and the taper tube part 15, and then it is caught by the swivel guide 23 in the taper tube part 15 and subjected to the speed reduction and supplied with the swivel property counterclockwise with respect to the tube axis Y—Y and flows down into the lower drainage vertical tube 33.

Also a part of the waste water flowing in from the lateral branch tube 36 collides with the inner tube 20 and is scattered and drops to the taper tube part 15. Also the residual waste water not colliding with the inner tube 20 drops to the swelling part 13 and the taper tube part 15 and is scattered and then is combined with the partial scattered waste water as above described and the combined waste water flows down along the inner circumferential wall of the taper tube part 15. And then it is caught by the swivel guide 23 and is subjected to the speed reduction and supplied with the swivel property counterclockwise and flows down into the lower drainage vertical tube 33.

Consequently, in the waste water flowing into the tube joint 10, its flowing-down rate is reduced effectively by the compression and rarefaction due to the scattering and mixing and the swivel action, and variation of the air pressure is prevented. Also the air core is formed at the center of the waste water, and ventilation is carried out between the upper drainage vertical tube 31 and the lower drainage vertical tube 33. Thereby pressure variation within the upper and lower drainage vertical tubes 31, 33 is suppressed.

Also in the waste water flowing down from the upper drainage tube 31, the countercurrent into the lateral branch tube 36 is prevented by the parting action of the inner tube 20 and the guide action of the reduction guide 21. Further the waste water flowing in from the lateral branch tube 36 is prevented from the direct collision with the waste water flowing down from the upper drainage vertical tube 31 by the inner tube 20, and acts effectively for the stabilization of the air pressure. Therefore breakage of a trap seal water of a sanitary instrument connected to the lateral branch tube 36 is prevented.

As clearly understood from the above description, according to the present invention, since a projected end edge of a reduction guide and a projected end edge of a swivel guide are formed nearly in parallel in projections of the horizontal plane and formed in intersection relation in projections of the vertical plane, and distance in the axis line direction between the lower end of the reduction guide and the upper end of the swivel guide is formed in 0.8-1.3 times of the inner diameter of the upper drainage vertical tube, even when the waste water flow rate is much, the ventilation core can be formed accurately and the pressure variation of the drainage piping system can be suppressed and breakage of the trap seal water can be prevented.

Also since the swivel guide can be formed by one bow-shaped projecting stripe part, the tube joint can be constituted concisely and made light weight and can be prevented from clogging due to foreign substance or the like and can be manufactured at a low price.

Further, effects are in that the countercurrent to the lateral branch tube is prevented by the inner tube and the reduction guide, and that the direct collision between the waste water flowing in from the lateral branch tube and the waste water flowing in from the upper drainage vertical tube is prevented.

What is claimed is:

1. A drainage vertical tube joint having a vertical central axis comprising: an upper vertical tube connection port for connecting an upper drainage vertical tube having an inner diameter; a swelled part provided at a lower side of said upper vertical tube connection port and having inner diameter larger than that of said upper drainage vertical tube; a taper tube part formed in downward tapering state at a lower side of said swelled part;

a lower vertical tube connection port provided at a lower side of said taper tube part for connecting a lower drainage vertical tube; and at least one lateral branch connection port provided on said swelled part and opened in the horizontal direction, said drainage vertical tube joint further comprising:

an inner tube provided in hanging-down state at a lower side of said upper vertical tube connection port;

a reduction guide projected in a downward incline on an inner circumferential wall of the inner tube and having a projected end edge inclined downward in a length direction;

a swivel guide projected on an inner circumferential wall of said taper tube part and having a projected end edge inclined downward in a length direction; and the projected end edge of said reduction guide and the projected end edge of said swivel guide being on opposite sides of said axis and formed in parallel relation in projection in a horizontal plane and formed in intersecting relation in projections in a vertical plane.

2. A drainage vertical tube joint as set forth in claim 1, wherein a distance in a direction of the vertical central axis between a lower end of said reduction guide and an upper end of said swivel guide is formed to be 0.8-1.3 times the inner diameter of the drainage vertical tube.

* * * * *